(12) United States Patent
Kovacs et al.

(10) Patent No.: US 12,123,513 B2
(45) Date of Patent: Oct. 22, 2024

(54) PERIMETER SEATED KNIFE GATE VALVE

(71) Applicant: ITT MANUFACTURING ENTERPRISES LLC, Wilmington, DE (US)

(72) Inventors: Richard Kovacs, Lancaster, PA (US); Jeremy Carroll, Wilmington, DE (US); Randy Bates, Hamilton, AL (US)

(73) Assignee: ITT Manufacturing Enterprises, LLC, Stamford, CT (US)

( * ) Notice: Subject to any disclaimer, the term of this patent is extended or adjusted under 35 U.S.C. 154(b) by 0 days.

(21) Appl. No.: 18/027,055

(22) PCT Filed: Oct. 27, 2020

(86) PCT No.: PCT/US2020/057475
§ 371 (c)(1),
(2) Date: Mar. 17, 2023

(87) PCT Pub. No.: WO2022/093181
PCT Pub. Date: May 5, 2022

(65) Prior Publication Data
US 2023/0323957 A1    Oct. 12, 2023

(51) Int. Cl.
*F16K 3/02*  (2006.01)
*F16K 3/312*  (2006.01)
(Continued)

(52) U.S. Cl.
CPC ......... *F16K 3/0227* (2013.01); *F16K 3/0281* (2013.01); *F16K 3/312* (2013.01); *F16K 3/316* (2013.01); *F16K 27/044* (2013.01)

(58) Field of Classification Search
CPC ...... F16K 3/0227; F16K 3/0281; F16K 3/312; F16K 3/316; F16K 27/044; Y10T 137/4273; F16J 15/46; F16J 15/48
See application file for complete search history.

(56) References Cited

U.S. PATENT DOCUMENTS 3,847,374 A * 11/1974 Tittelbach ............... F16K 27/02
285/133.11
3,885,701 A *  5/1975 Becklin .................. B65D 43/02
220/325

(Continued)

OTHER PUBLICATIONS

International Search Report and Written Opinion for International Application No. PCT/US20/57475 mailed on Jan. 19, 2021, pp. 9.

(Continued)

*Primary Examiner* — John Bastianelli
(74) *Attorney, Agent, or Firm* — Turk IP Law, LCC (57) ABSTRACT

A perimeter seated knife gate valve is described. Perimeter and transverse seals may be formed together as a single-piece or as two separate pieces. Wire-reinforced and with a rectangular cross section, the perimeter seal (portion) may fit into a corresponding groove in the single-piece body of the valve. Transverse seal (portion) may include two channels formed as side grooves or tubular channels to accept packing material, which energize the seal and are isolated from the fluid stream. In the two-piece version, a bottom groove of the transverse seal may be used to interlock both pieces. The shape and structure of the seal may allow single-piece valve body.

14 Claims, 10 Drawing Sheets (51) Int. Cl.
*F16K 3/316* (2006.01)
*F16K 27/04* (2006.01)

(56) References Cited

U.S. PATENT DOCUMENTS

| | | | | | |
|---|---|---|---|---|---|
| 3,917,223 | A | * | 11/1975 | Sidler | F16K 3/0281 |
| | | | | | 251/328 |
| 4,206,905 | A | * | 6/1980 | Dobler | F16K 3/0263 |
| | | | | | 251/328 |
| 5,653,423 | A | * | 8/1997 | Young | F16K 3/0281 |
| | | | | | 251/360 |
| 6,375,157 | B1 | * | 4/2002 | Van de Lande | F16K 27/044 |
| | | | | | 251/327 |
| 6,959,912 | B2 | * | 11/2005 | Reeves | F16K 41/04 |
| | | | | | 251/327 |
| 7,059,586 | B2 | | 6/2006 | Vanderberg et al. | |
| 7,201,361 | B2 | * | 4/2007 | Grandage | F16K 3/316 |
| | | | | | 251/355 |
| 7,350,766 | B2 | * | 4/2008 | Comstock | F16K 27/044 |
| | | | | | 251/328 |
| 7,815,170 | B2 | | 10/2010 | Devine, Jr. et al. | |
| 8,056,882 | B2 | * | 11/2011 | Ohlson | F16J 15/062 |
| | | | | | 251/355 |
| 10,054,238 | B2 | * | 8/2018 | Watterodt | F16K 3/0281 |
| 10,161,529 | B2 | | 12/2018 | Nguyen et al. | |
| 10,663,067 | B2 | | 5/2020 | Sidler | |

OTHER PUBLICATIONS

Keystone Figure PCS17 Perimeter seal; https://keystone.id/products/knife-gate-valves/keystone-figure-pcs17-perimeter-seal/, pp. 3.

Keystone Figure PCS17, Knife Gate Valves, pp. 4.

* cited by examiner

PERIMETER SEATED KNIFE GATE VALVE

CROSS-REFERENCE TO RELATED APPLICATIONS

The present application is a U.S. National Stage filing under 35 U.S.C. § 371 of International Application PCT/US20/57475, filed Oct. 27, 2020.

BACKGROUND

Unless otherwise indicated herein, the materials described in this section are not prior art to the claims in this application and are not admitted as prior art by inclusion in this section.

A knife gate valve is a valve that utilizes a blade to cut through clogging of heavy liquids or liquids with solids in them. Knife gate valves are used in a variety of applications in a broad range of industries, including but not limited to, pulp and paper, chemical, petroleum refining, mining, iron and steel manufacture, wastewater, power generation, food and beverage, and marine applications. Size of knife gate valves may also vary appreciably, ranging from inches to several feet diameter pathways. As knife gate valves can be used in a wide range of applications, they may be subjected to varying environments, for example, high pressure, high temperature, abrasive, and other types of liquids. In many applications, continuous operation of a valve is important. Thus, interruptions such as disassembly of the valve for seal replacement are undesired.

SUMMARY

The present disclosure generally describes perimeter seated knife gate valve and methods of manufacturing perimeter seated knife gate valve.

According to some examples, a knife gate valve may include an actuator configured to actuate the knife gate valve through a rotation or linear action; a stem configured to receive the rotation or linear action and, in response to the rotation or linear action, cause a knife gate to move linearly; a single-piece body configured to define a flow channel and to receive the knife gate slideably in response to the linear movement of the knife gate, where a sliding movement of the knife gate opens and closes the flow channel; and a single-piece seal. The single-piece seal may include a perimeter seal portion configured to fit into a perimeter groove along an inside surface of the body; a transverse seal portion configured to fit into a top portion of the body transversal to the flow channel, where the transverse seal portion includes a slot for the knife gate to slide through and two channels; and packing material configured to be injected into the two channels in order to energize the transverse seal portion.

According to other examples, the knife gate valve may further include a reinforcement wire embedded longitudinally into the perimeter seal portion. The top portion of the body may include at least two injection holes for the packing material to be injected into the two channels. The two channels in the transverse seal portion may be grooves along two side surfaces of the transverse seal portion or tubular channels inside the transverse seal portion. The stem may be threaded and the valve may further include a stem nut coupled to the knife gate and configured to move along the stem in response to the rotation of the stem cause the linear movement of the knife gate.

According to further examples, the knife gate valve may include at least one set of scrapers configured to be positioned on either side of the knife gate on a top and/or a bottom surface of the transverse seal portion. The perimeter seal portion and the transverse seal portion may include an elastomeric material. The elastomeric material may include one or more of natural rubber, synthetic rubber, Ethylene Propylene Diene Monomer (EPDM), or fluoroelastomer. The perimeter seal portion and the perimeter groove may have a substantially rectangular cross section. The perimeter seal portion may include one or more of an indentation, a protrusion, or a groove on one or more sides of the substantially rectangular cross section.

According to other examples, a knife gate valve may include an actuator configured to actuate the knife gate valve through a rotation or linear action; a stem configured to receive the rotation or linear action and, in response to the rotation or linear action, cause a knife gate to move linearly; a single-piece body configured to define a flow channel and to receive the knife gate slideably in response to the linear movement of the knife gate, where a sliding movement of the knife gate opens and closes the flow channel; and a two-piece seal. The two-piece seal may include a perimeter seal configured to fit into a perimeter groove along an inside surface of the body; a transverse seal configured to fit into a top portion of the body transversal to the flow channel, where the transverse seal includes a slot for the knife gate to slide through, a bottom groove to interlock with the perimeter seal, and two channels; and packing material configured to be injected into the two channels in order to energize the transverse seal.

According to some examples, the knife gate valve may further include a reinforcement wire embedded longitudinally into the perimeter seal. The top portion of the body may include at least two injection holes for the packing material to be injected into the two channels. The two channels in the transverse seal portion may be grooves along two side surfaces of the transverse seal portion or tubular channels inside the transverse seal portion. The stem may be threaded and the valve may further include a stem nut coupled to the knife gate and configured to move along the stem in response to the rotation of the stem cause the linear movement of the knife gate.

According to other examples, the knife gate valve may include at least one set of scrapers configured to be positioned on either side of the knife gate on a top and/or a bottom surface of the transverse seal. The perimeter seal and the transverse seal may include an elastomeric material. The elastomeric material may include one or more of natural rubber, synthetic rubber, Ethylene Propylene Diene Monomer (EPDM), or fluoroelastomer. The perimeter seal and the perimeter groove may have a substantially rectangular cross section. The perimeter seal may include one or more of an indentation, a protrusion, or a groove on one or more sides of the substantially rectangular cross section.

According to further examples, a single-piece seal for a knife gate valve may include a perimeter seal portion configured to fit into a perimeter groove along an inside surface of a single-piece body of the valve, where the body defines a flow channel and a top portion transversal to the flow channel to receive a knife gate slideably in response to a rotational or linear movement of a stem, and a sliding movement of the knife gate opens and closes the flow channel. The single-piece seal may also include a transverse seal portion configured to fit into the top portion, where the transverse seal portion includes a slot for the knife gate to slide through and two channels; and packing material configured to be injected into the two channels in order to energize the transverse seal portion.

According to some examples, the single-piece seal may further include a reinforcement wire embedded longitudinally into the perimeter seal portion. The packing material may be injected into the two channels through at least two injection holes on a side surface of the top portion of the body. The perimeter seal portion and the transverse seal portion may include an elastomeric material. The elastomeric material may include one or more of natural rubber, synthetic rubber, Ethylene Propylene Diene Monomer (EPDM), or fluoroelastomer. The perimeter seal portion and the perimeter groove may have a substantially rectangular cross section. The perimeter seal portion may include one or more of an indentation, a protrusion, or a groove on one or more sides of the substantially rectangular cross section.

According to yet other examples, a two-piece seal for a knife gate valve may include a perimeter seal configured to fit into a perimeter groove along an inside surface of a single-piece body of the valve, where the body defines a flow channel and a top portion transversal to the flow channel to receive a knife gate slideably in response to a rotational or linear movement of a stem, and a sliding movement of the knife gate opens and closes the flow channel. The two-piece seal may also include a transverse seal configured to fit into the top portion, where the transverse seal includes a slot for the knife gate to slide through, a bottom groove to interlock with the perimeter seal, and two channels; and packing material configured to be injected into the two channels in order to energize the transverse seal.

According to further examples, the two-piece seal may include a reinforcement wire embedded longitudinally into the perimeter seal. The packing material may be injected into the two channels through at least two injection holes on a side surface of the top portion of the body. The perimeter seal and the transverse seal may include an elastomeric material. The elastomeric material may include one or more of natural rubber, synthetic rubber, Ethylene Propylene Diene Monomer (EPDM), or fluoroelastomer. The perimeter seal and the perimeter groove may have a substantially rectangular cross section. The perimeter seal may include one or more of an indentation, a protrusion, or a groove on one or more sides of the substantially rectangular cross section.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices related to perimeter seated knife gate valve.

Briefly stated, technologies are generally described for perimeter seated knife gate valve. Perimeter and transverse seals may be formed together as a single-piece or as two separate pieces. Wire-reinforced and with a rectangular cross section, the perimeter seal (portion) may fit into a corresponding groove in the single-piece body of the valve. Transverse seal (portion) may include two side grooves to accept packing material, which energize the seal and are isolated from the fluid stream. In the two-piece version, a bottom groove of the transverse seal may be used to interlock both pieces. The shape and structure of the seal may allow single-piece valve body.

Figure 1:
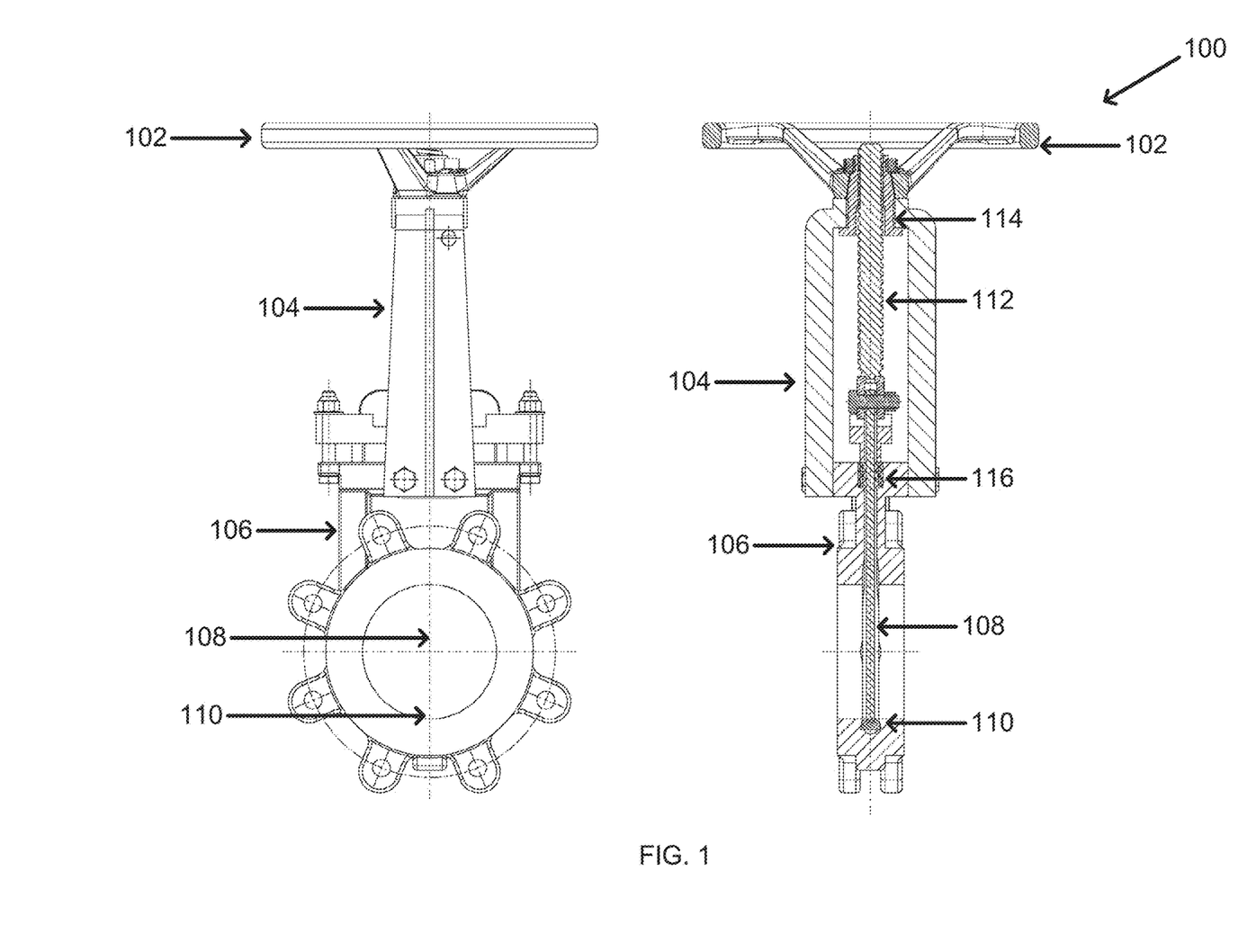
FIG. 1 illustrates plan and cross-sectional views of a manually actuated, bidirectional knife gate valve.

FIG. 1 illustrates plan and cross-sectional views of a manually actuated, bidirectional knife gate valve.

As illustrated in diagram 100, an example knife gate valve may include a handwheel 102, a yoke 104 containing stem 112, body 106, gate 108 (also referred to as blade). A perimeter seal 110 may be fitted on an inside surface of a flow channel formed by the body 106 and packing 116 may be fitted into a groove at the top of the body 106, below where the body 106 and the yoke 104 connect.

In an operation, the handwheel 102 may turn a drive nut 114, which is positioned around the threaded stem 112. The drive nut 114 may be coupled to the gate 108, and the rotation of the drive nut 114 may cause it to move up and down along the stem 112, which in turn causes the gate 108 to move up and down opening or closing the flow channel formed by the body 106. In other examples, the drive nut 114 may be linearly stationary, and the gate 108 may be coupled to the stem 112. Thus, rotation of the drive nut may cause the stem and thereby the gate to move up and down. Various additional components (not shown) may be used for operational aspects. Such components may include various springs, retaining washers, retaining nuts, etc.

In some examples, a lockout pin and a number of lockout holes in the yoke may mechanically prevent the valve from being opened or closed for safety purposes. Further components, not shown or shown but not discussed, may also be present.

Figure 2:
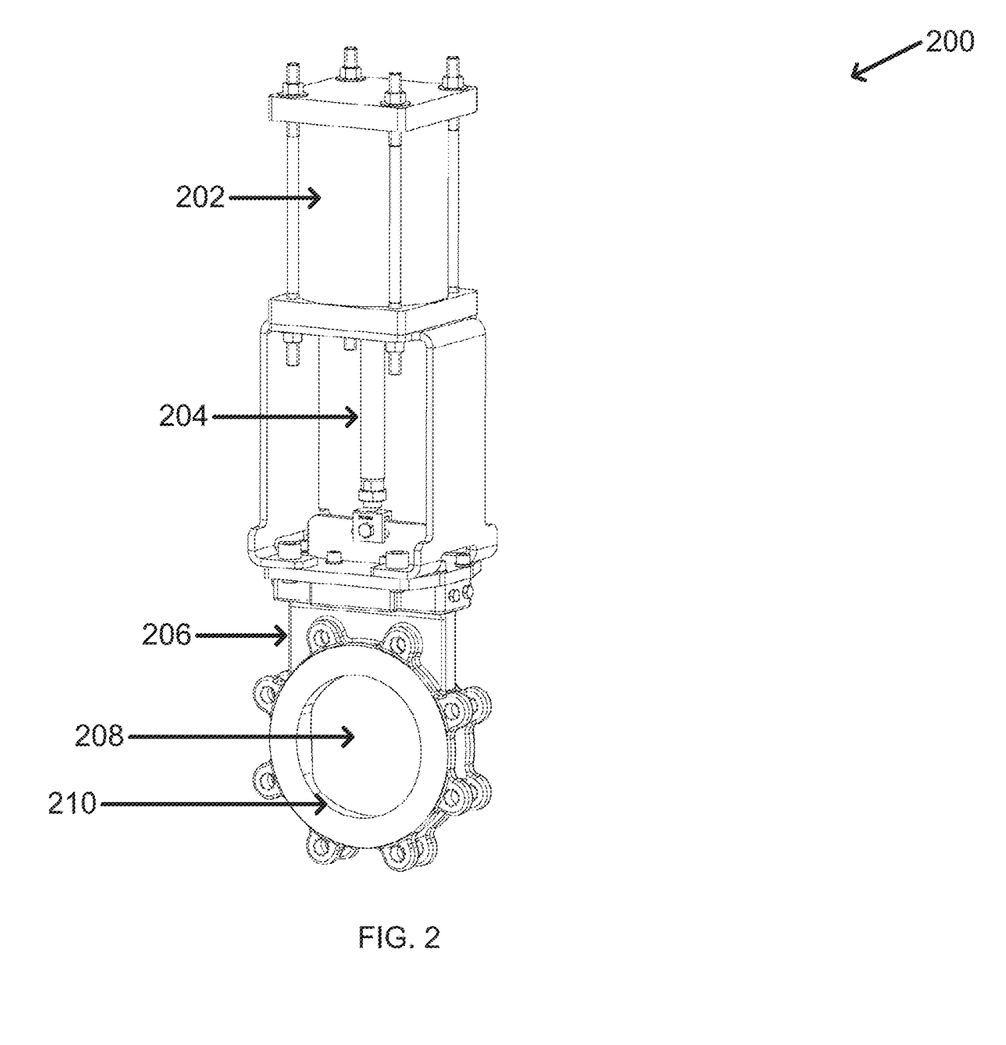
FIG. 2 illustrates a perspective view of a pneumatically actuated knife gate valve.

FIG. 2 illustrates a perspective view of a pneumatically operated knife gate valve.

Diagram 200 shows the stem 204 and the body 206 of an example knife gate valve with the gate 208 and perimeter seal 210. The stem's movement is actuated by a pneumatic actuator 202. Thus, the example valve in FIG. 2 may be locally or remotely operated. The pneumatic actuator 202 may provide linear action to the stem/gate as opposed to the rotation action provided in the manual configuration discussed above. Thus, knife gate valves may be actuated by rotational or linear action.

Knife gate valves can cut through slurries, scale, and surface build ups. Furthermore, they provide an unobstructed, bidirectional flow channel allowing high flow capacity and also large objects to pass through the valve. However, knife gate valves have historically been associated with external leaks. To close and open the valve, the gate moves in or exits the body and is connected to the stem which opens and closes the valve. Thus, the gate needs to be sealed at the ingress/egress point. Typical approaches are "row packing" or transverse seal. Traditionally, packing material has been used. Several rows of packing material are inserted in the gate and squeezed by the packing gland mechanism. The use of elastomeric transverse seals has increased the ability of knife gate valves to provide a tighter external seal. While elastomeric transverse seal design improves the sealing relationship, this design allows the injectable packing material used in the lateral seal to mix with the fluid media, which can be disadvantageous in some applications.

The intersection of the perimeter seal and the external gate seal (packing or transverse) is a problem area. It can be difficult to seal, due to movement of each seal. In some implementations, perimeter seal and external transverse seal may be formed as a single part. However, designs like that require a two-piece body in order to retain the seal. Each body half requires extensive machining of grooves needed to retain the perimeter and transverse seals. For example, the perimeter seal may have a trapezoidal shape for retaining the seal in the body during operation. Thus, a trapezoidal groove is needed in the body, which needs to be made as two separate parts and combined with the seal inserted. Transverse seal integral with perimeter seal may include internal packing channels, energized by screws on the side of the body.

In other examples, expandable sealing surfaces of the gate slot may have a convex geometry, such as a rounded geometry with a single continuous arc from a lower plane to an upper plane of the transverse seal. Other convex geometries may include multiple arcs or ridges. In addition to the manual (handwheel) and motorized actuation, a knife gate valve may also be actuated by pneumatic, hydraulic, electric, or bevel gear actuators.

Figure 3A:
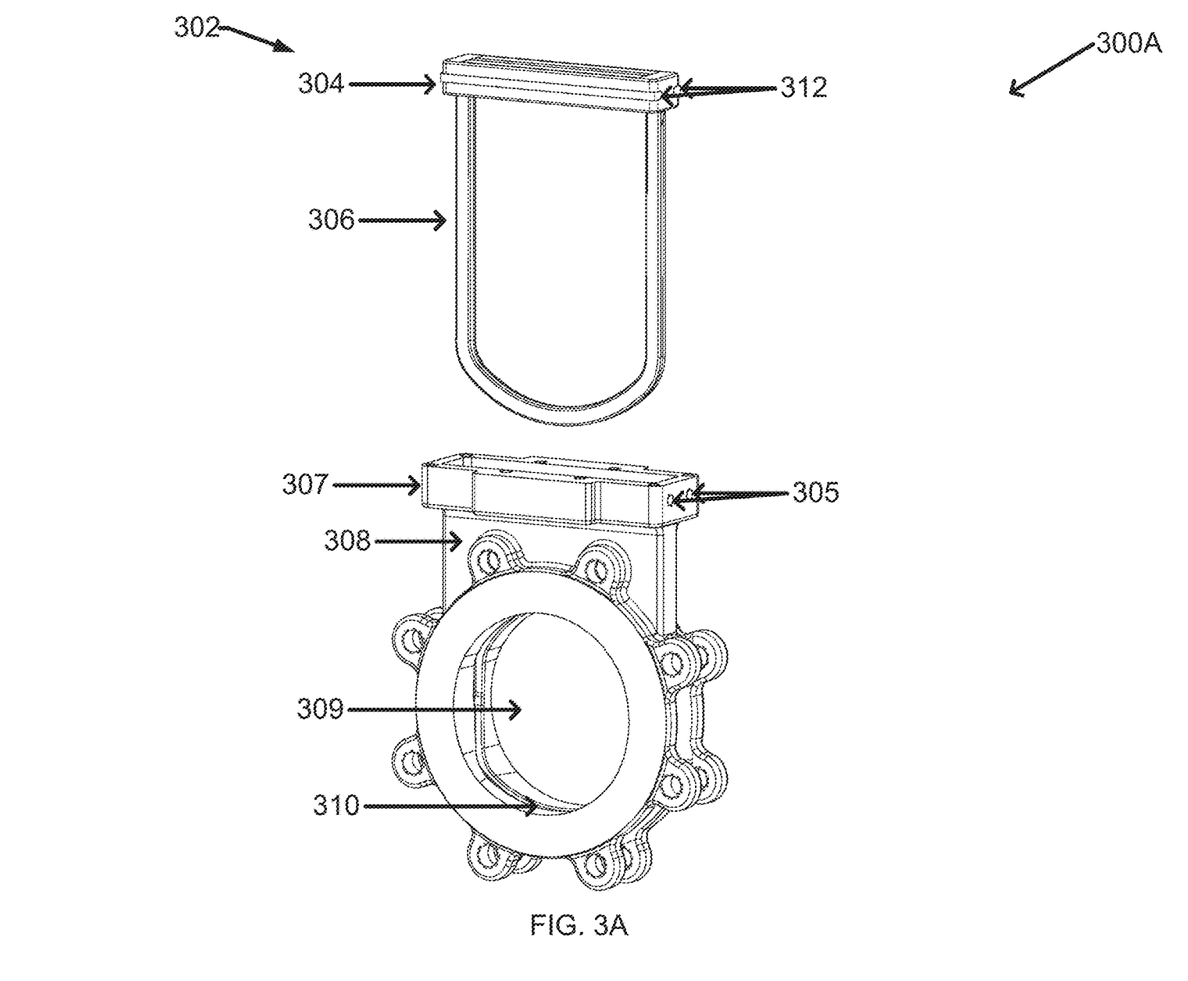
FIG. 3A illustrates a perspective view of a single-piece knife gate valve seal and body of the valve where the seal is fitted.

FIG. 3A illustrates a perspective view of a single-piece knife gate valve seal and body of the valve where the seal is fitted, arranged in accordance with at least some embodiments described herein.

Diagram 300A shows single-piece seal 302 comprising a transverse seal portion 304 and a perimeter seal portion 306 formed as a single seal. The diagram also shows body 308 with flow channel 309, perimeter seal groove 310, and top portion 307 in the body 308. Packing material 312 is shown in respective grooves in the transverse seal portion 304 and insertion holes 305 in the top portion to insert packing material 312.

A single-piece seal 302 includes two portions: the perimeter seal portion 306 configured to fit into the perimeter seal groove 310 in the body 308, and the transverse seal portion 304 configured to fit into the top portion 307. The structure of the transverse seal portion 304 (lateral grooves or channels lined up with the insertion holes 305) may allow insertion of packing material 312 while the valve is operating. The perimeter seal portion 306 may avoid having machined grooves in a two-piece body, because the seal may fit into a substantially rectangular groove in the body. In some examples, an enforcement wire may be embedded into the perimeter seal portion 304. The packing material 312 energizes the seal and may be a single layer but can also be multiple layers. The top portion 307 may further create mounting points for the yoke (not shown).

Figure 3B:
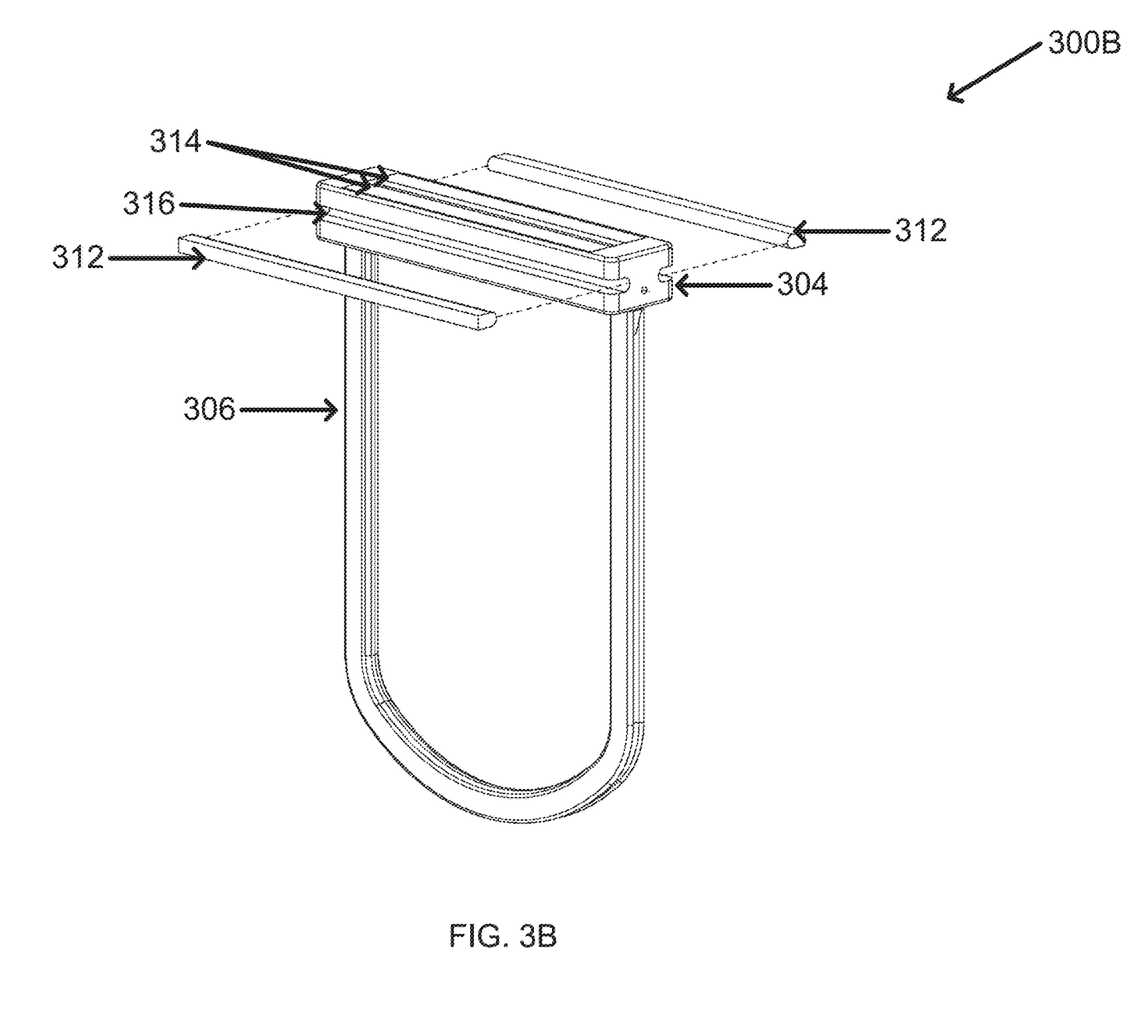
FIGS. 3B and 3C illustrate exploded perspective views of the single-piece knife gate valve seal and accompanying parts.
Figure 3C:
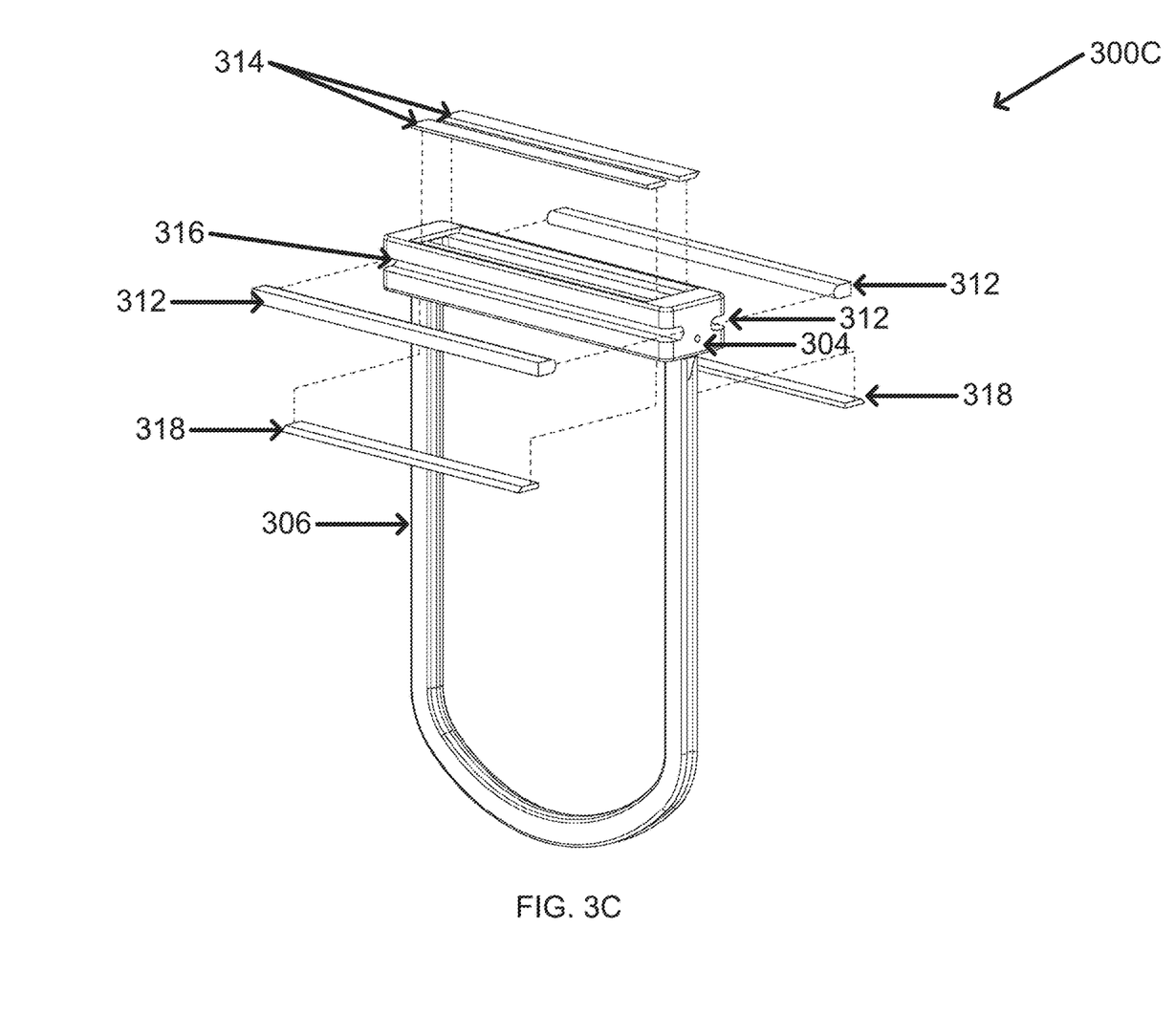

FIGS. 3B and 3C illustrate exploded perspective views of the single-piece knife gate valve seal and accompanying parts, arranged in accordance with at least some embodiments described herein.

Diagram 300B shows perimeter seal portion 306 and transverse seal portion 304 along with packing material 312 to fit into grooves 316 and scrapers 314. Scrapers 314 help keep the gate clean as it is raised and lowered through the transverse seal portion 304 and minimize debris from entering the transverse seal portion 304 and potentially interfering with the seal between the gate and expandable sealing surfaces. A knife gate valve according to embodiments may include two sets of scrapers on the top and bottom surfaces of the transverse seal portion 304. In diagram 300B, only the top set of scrapers are shown, whereas diagram 300C shows both sets 314, 318. In practice, one set of scrapers may be used as well.

Because the packing materials 312 are isolated from the slot in the transverse seal portion 304 (on the lateral outside surfaces), accidental leakage of the injectable packing material into the flow stream is avoided. Once injected into the grooves (or channels) 316, the packing material 312 energize the transverse seal portion 304 pushing its inner surfaces toward the gate. Inner surfaces of the perimeter seal portion 306 form a seal with a fully lowered gate closing the valve. In some examples, the perimeter seal portion 306 may have a substantially rectangular (or square) cross section. Thus, the perimeter seal portion 306 may fit into a substantially rectangular groove on an inside surface of the single-piece body eliminating the need for a two-piece body with machined grooves, thereby, reducing cost and complexity of the valve. The cross-section shape of the perimeter seal portion 306 does not need to have a straight-edged rectangular form. For example, indentations, protrusions, and/or grooves may be included on one or more sides of the substantially rectangular cross section to allow for tolerances, fitting, and improved performance when the seal is pressed into the corresponding groove in the body 308.

While longitudinal grooves along the transverse seal (portion) are shown herein to accept packing material, the transverse seal (portion) may also be designed with tubular channels along the length of the seal. In such embodiments, the packing material may be completely isolated from the flow stream preventing any potential mixing with the flow stream.

Figure 4A:
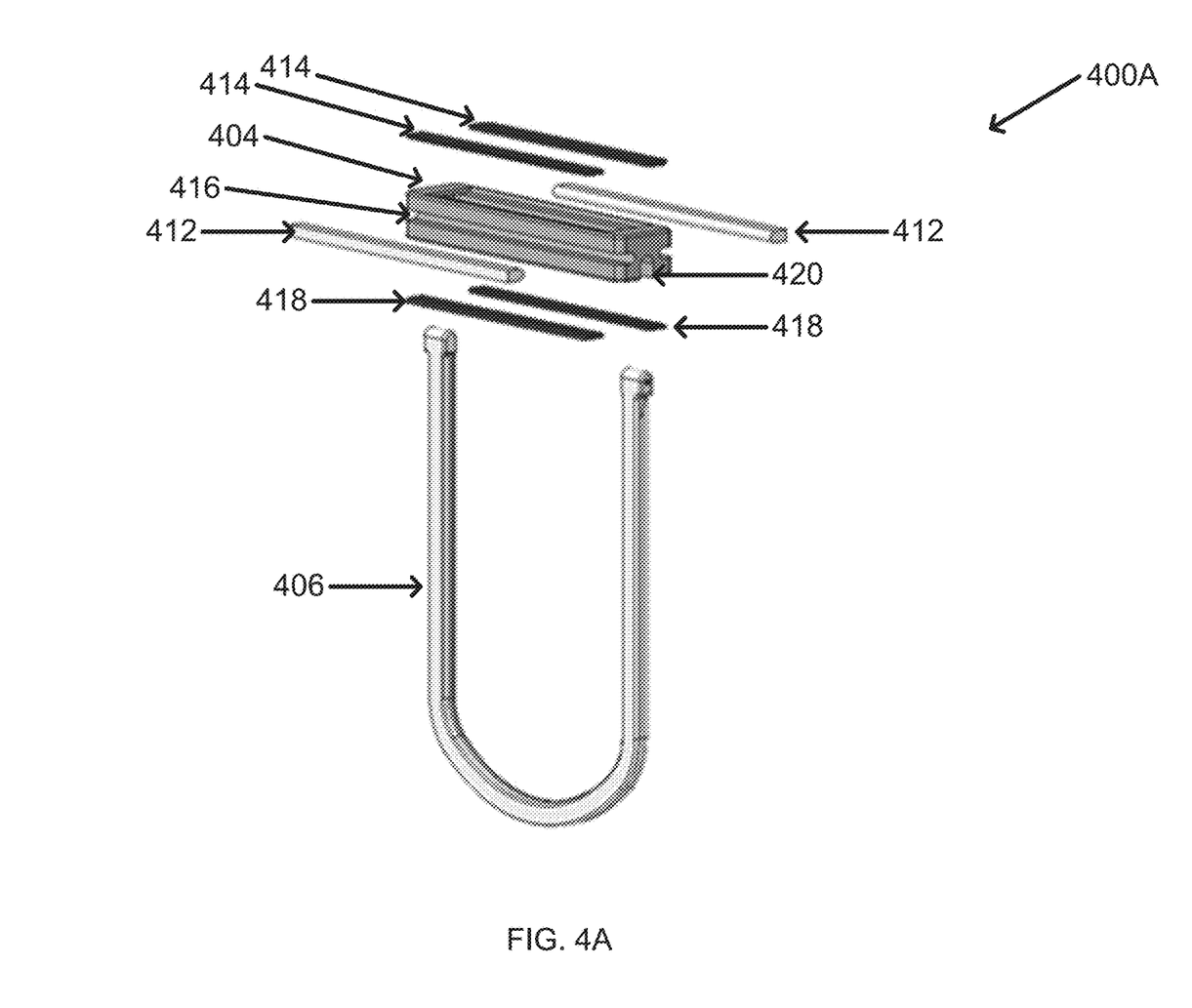
FIG. 4A illustrates exploded perspective view of a two-piece knife gate valve seal and accompanying parts.

FIG. 4A illustrates exploded perspective view of a two-piece knife gate valve seal and accompanying parts and FIG.

Figure 4B:
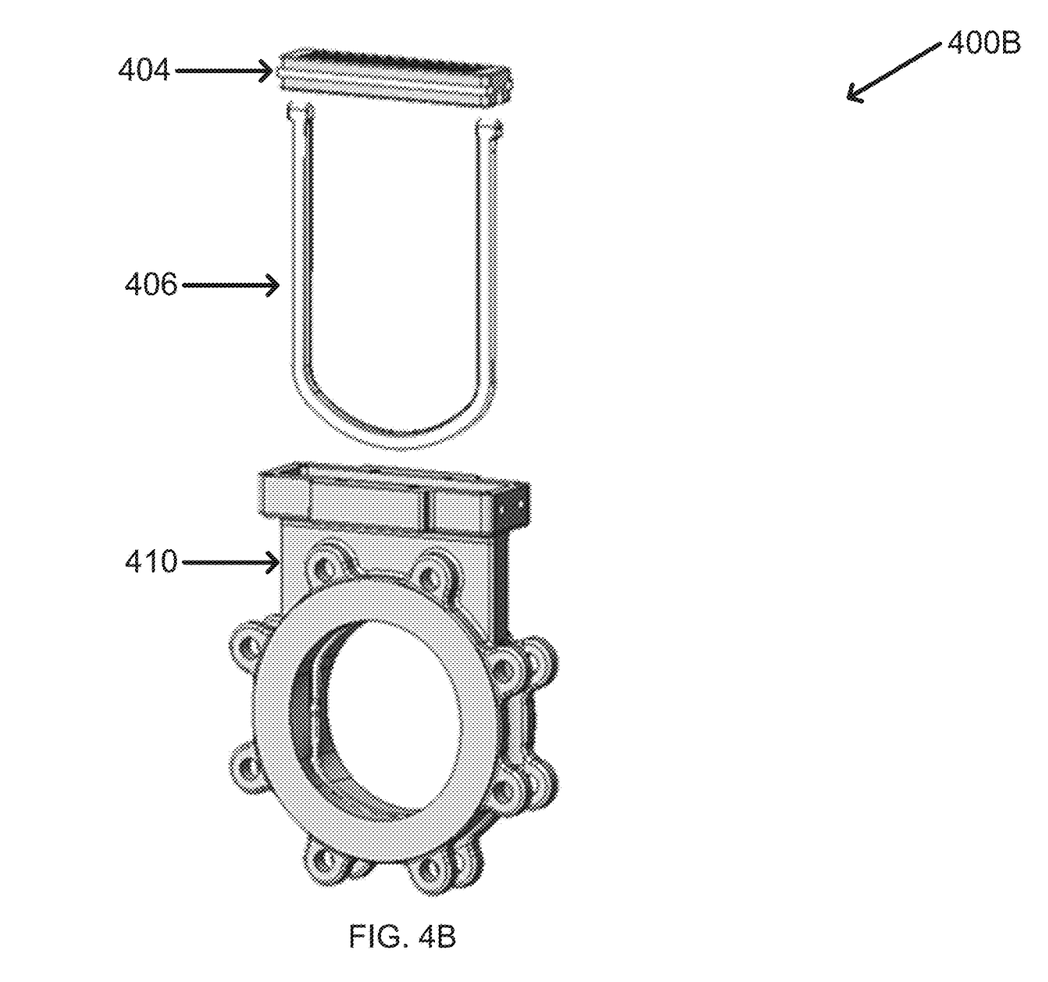
FIG. 4B illustrates a perspective view of a two-piece knife gate valve seal and body of the valve where the seal is fitted.

4B illustrates a perspective view of a two-piece knife gate valve seal and body of the valve where the seal is fitted, arranged in accordance with at least some embodiments described herein.

Diagram 400A shows two separate pieces of the seal, perimeter seal 406 and transverse seal 404. The diagram further shows, top and bottom scraper sets 414, 418, packing material 412, and packing material grooves 416 and perimeter seal groove 420 in the transverse seal 404. Diagram 400B shows the two separate pieces of the seal and the body 410 of the valve in a perspective view.

Differently from the single-piece version, in the two-piece version the perimeter seal 406 and the transverse seal 404 may be formed separately. First the perimeter seal 406 may be inserted into the corresponding groove in the body 410, then the transverse seal 404 may be fitted on top of the perimeter seal with the top portions of the perimeter seal 406 interlock with the perimeter seal groove 420 at a bottom surface of the transverse seal 404. As in the single-piece version, the perimeter seal 406 may be reinforced with a wire. As discussed above, the cross-section shape of the perimeter seal 406 may include indentations, protrusions, and/or grooves on one or more sides of the substantially rectangular cross section to allow for tolerances, fitting, and improved performance when the seal is pressed into the corresponding groove in the body.

Figure 5A:
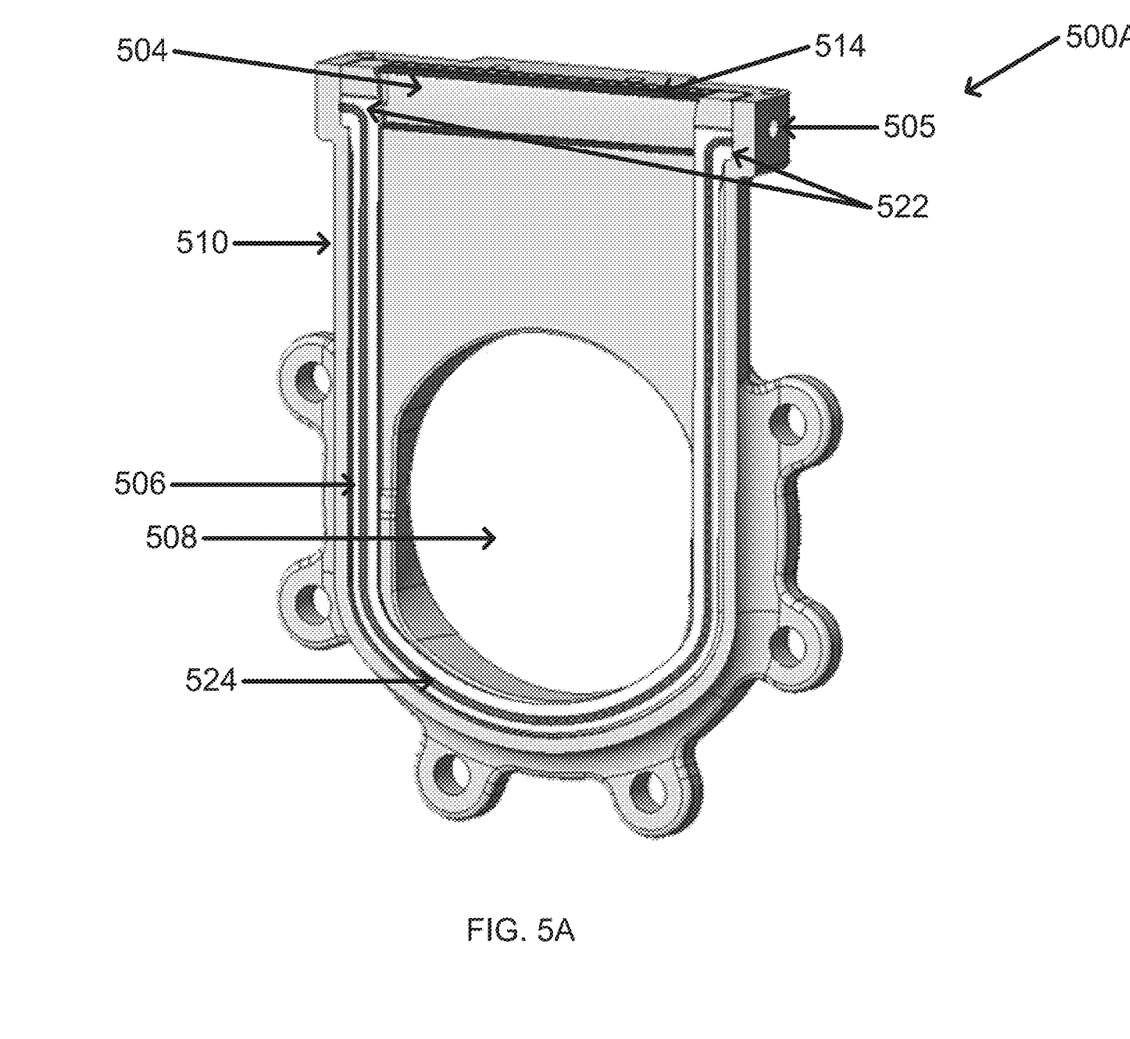
FIG. 5A illustrates a cross-sectional perspective view of a two-piece knife gate valve seal fitted into a body of a valve.

FIG. 5A illustrates a cross-sectional perspective view of a two-piece knife gate valve seal fitted into a body of a valve, arranged in accordance with at least some embodiments described herein.

Diagram 500A shows body 510 with the flow channel 508. Perimeter seal 506 enforced with wire 524 is fitted into the perimeter seal groove in the body 510. Top portions 522 of the perimeter seal 506 are interlocked with the transverse seal 504 through a bottom groove. Side holes (only one shown) 505 are used to inject packing materials to side grooves in the transverse seal 504. Top scrapers 514 are positioned on a top surface of the transverse seal 504.

As discussed previously, shape and structure of the perimeter seal 506 allows it to be fitted into a substantially rectangular groove in the body, thereby, allowing the body 510 to be formed as a single-piece body. The body, yoke, and other structural components may be metallic, such as stainless steel, carbon steel, plated steel, and the like. Certain components, such as the nuts and bolts, may be fabricated of bronze. The scrapers may comprise a phenolic resin, which provides stiffness and durability for good scraping, while not causing excessive wear on the knife gate. The perimeter seal and transverse seal may be formed of any elastomeric material, such as a natural or synthetic rubber, Ethylene Propylene Diene Monomer (EPDM), fluoroelastomer, etc.

Figure 5B:
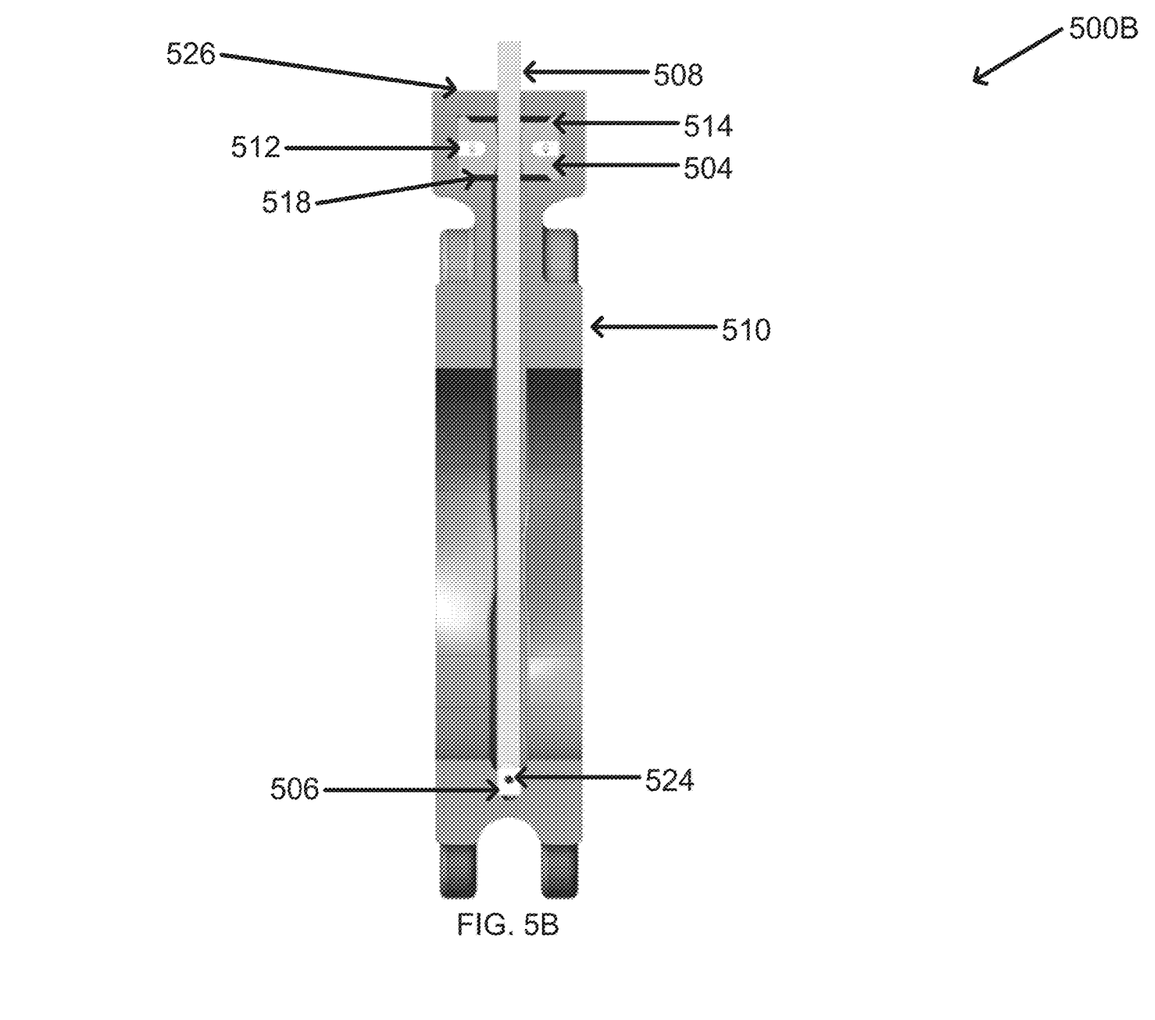
FIG. 5B illustrates a cross-sectional side view of the two-piece knife gate valve seal fitted into the body of the valve.

FIG. 5B illustrates a cross-sectional side view of the two-piece knife gate valve seal fitted into the body of the valve, arranged in accordance with at least some embodiments described herein.

Diagram 500B shows body 510 of the valve with perimeter seal 506 and its reinforcing wire 524 in the perimeter seal groove. The top portion of the body 510 includes the transverse seal 504, packing material 512 and scrapers 514, 518. A top plate 526 secures the transverse seal 504 in place while providing a slot for the gate 508 to pass through. Top plate 526 may also provide mechanical connection means for the yoke to the body 510. In the diagram, gate 508 is shown in fully lowered position making contact and forming a seal with the perimeter seal 506, while the transverse seal 504 energized by the packing material 512 is making contact with side surfaces of the gate 508 forming a seal at the top of the body.

Some of the above-discussed elements are typical features of knife gate valves generally and are not unique or critical to the present disclosure. Accordingly, embodiments are not limited to valves having any particular components except those specifically recited in the claims.

Figure 6:
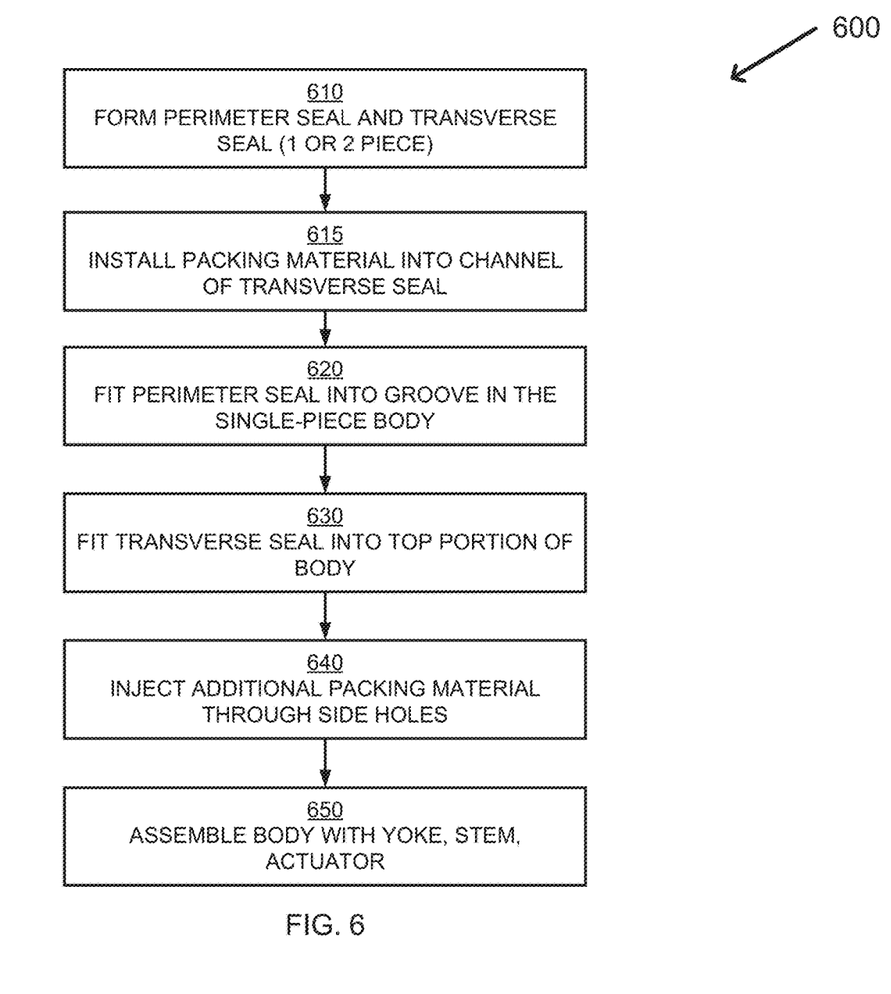
FIG. 6 illustrates a flowchart for a process of manufacturing a perimeter seated knife gate valve, some of which arranged in accordance with at least some embodiments described herein.

FIG. 6 illustrates a flowchart for a process of manufacturing a perimeter seated knife gate valve, arranged in accordance with at least some embodiments described herein.

Example methods may include one or more operations, functions, or actions as illustrated by one or more of blocks 610, 620, 630, 640, and 650 may in some embodiments be performed by a manufacturing system, automated, manual, or a combination thereof. Such operations, functions, or actions in FIG. 6 and in the other figures, in some embodiments, may be combined, eliminated, modified, and/or supplemented with other operations, functions or actions, and need not necessarily be performed in the exact sequence as shown. The operations described in the blocks 610-650 may be implemented through execution of computer-executable instructions stored in a computer-readable medium and executed by a computer controlling the manufacturing system.

An example process to provide a perimeter seated knife gate valve may begin with block 610, "FORM PERIMETER SEAL AND TRANSVERSE SEAL (1 OR 2 PIECE)", where the perimeter seal (reinforced with a wire and rectangular cross section) may be formed along with a transverse seal with its side grooves for packing material and bottom groove to interlock with the perimeter seal. Alternatively, the perimeter seal and transverse seal may be formed together as a single-piece seal.

Block 610 may be followed by block 620, "FIT PERIMETER SEAL INTO GROOVE IN THE SINGLE-PIECE BODY", where the manufacturing system may fit the perimeter seal (portion) into the rectangular groove on the inside surface of the single-piece body of the valve.

Block 610 may be followed by block 615, "INSTALL PACKING MATERIAL INTO CHANNEL OF TRANSVERSE SEAL", where the manufacturing system may insert packing material into groove(s) along side surface(s) of the transverse seal. The packing material may energize the seal.

Block 615 may be followed by block 630, "FIT TRANSVERSE SEAL INTO TOP PORTION OF BODY", where the manufacturing system may fit the transverse seal (portion) into the top portion of the body. In some examples, a set of bottom scrapers may be positioned below the transverse seal (portion). In case of the two-piece seal, the transverse seal may be interlocked with the perimeter seal through the bottom groove of the transverse seal.

Block 630 may be followed by block 640, "INJECT ADDITIONAL PACKING MATERIAL THROUGH SIDE HOLES", where the manufacturing system may inject additional packing material through the side holes of the top portion of the body into the side grooves of the transverse seal further energizing the transverse seal.

Block 640 may be followed by block 650, "ASSEMBLE BODY WITH YOKE, STEM ACTUATOR", where the manufacturing system may assemble remaining parts of the valve such as the yoke, the stem, the actuator, and any other ancillary components.

The operations included in process 600 are for illustration purposes. Assembly of a perimeter seated knife gate valve may be implemented by similar processes with fewer or additional operations, as well as in different order of operations using the principles described herein. The operations described herein may be executed by one or more assembly devices/systems managed by one or more computing devices, one or more processor cores, and/or specialized processing devices, among other examples.

While examples are discussed using specific valve designs herein, embodiments are not limited to the example configurations. Embodiments may also be implemented in other forms of similar valves or machines that utilize a sliding gate (or blade) to open and close a flow channel.

Disclosed herein are methods and devices to provide a perimeter seated knife gate valve. The benefits of the presently disclosed valve and seal assembly configurations are numerous. For example, the methods and devices employed herein enable valve life expectancy to be enhanced and replacement of seals without valve operation interruption. Furthermore, complexity and cost of valves may be reduced by using single-piece body and even further by using single-piece seal.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A single-piece seal for a knife gate valve, the single-piece seal comprising:
   a perimeter seal portion configured to fit into a perimeter groove along an inside surface of a single-piece body of the valve, wherein
      the body defines a flow channel and a top portion transversal to the flow channel to receive a knife gate slideably in response to a rotational or linear movement of a stem, and
      a sliding movement of the knife gate opens and closes the flow channel;
   a transverse seal portion configured to fit into the top portion, wherein the transverse seal portion includes a slot for the knife gate to slide through and two external grooves along two side surfaces of the transverse seal portion, and the perimeter seal portion and the transverse seal portion are integrated; and
   packing material configured to be injected into the two external grooves through at least two injection ports in a top portion of the single-piece body in order to energize the transverse seal portion.

2. The single-piece seal of claim 1, further comprising:
   a reinforcement wire embedded longitudinally into the perimeter seal portion.

3. The single-piece seal of claim 1, wherein the perimeter seal portion and the transverse seal portion comprise an elastomeric material.

4. A two-piece seal for a knife gate valve, the two-piece seal comprising:
   a perimeter seal configured to fit into a perimeter groove along an inside surface of a single-piece body of the valve, wherein
      the body defines a flow channel and a top portion transversal to the flow channel to receive a knife gate slideably in response to a rotational or linear movement of a stem, and
      a sliding movement of the knife gate opens and closes the flow channel;
   a transverse seal configured to fit into the top portion, wherein the transverse seal includes a slot for the knife gate to slide through, a bottom groove to interlock with the perimeter seal, and two external grooves along two side surfaces of the transverse seal portion; and
   packing material configured to be injected into the two external grooves through at least two injection ports in a top portion of the single-piece body in order to energize the transverse seal.

5. The two-piece seal of claim 4, further comprising:
   a reinforcement wire embedded longitudinally into the perimeter seal.

6. The two-piece seal of claim 4, wherein the perimeter seal and the perimeter groove have a substantially rectangular cross section.

7. A knife gate valve comprising:
   an actuator configured to actuate the knife gate valve through a rotation or linear action;
   a stem configured to receive the rotation or linear action and, in response to the rotation or linear action, cause a knife gate to move linearly;
   a single-piece body configured to define a flow channel and to receive the knife gate slideably in response to the linear movement of the knife gate, wherein a sliding movement of the knife gate opens and closes the flow channel; and
   a single-piece seal comprising:
      a perimeter seal portion configured to fit into a perimeter groove along an inside surface of the body;
      a transverse seal portion configured to fit into a top portion of the body transversal to the flow channel, wherein the transverse seal portion includes a slot for the knife gate to slide through and two external grooves along two side surfaces of the transverse seal portion, and the perimeter seal portion and the transverse seal portion are integrated; and
      packing material configured to be injected into the two external grooves through at least two injection ports in a top portion of the single-piece body in order to energize the transverse seal portion.

8. The knife gate valve of claim 1, further comprising:
   a reinforcement wire embedded longitudinally into the perimeter seal portion.

9. The knife gate valve of claim 7, wherein the stem is threaded and the valve further comprises:
   a stem nut coupled to the knife gate and configured to move along the stem in response to the rotation of the stem cause the linear movement of the knife gate.

10. The knife gate valve of claim 7, further comprising:
    at least one set of scrapers configured to be positioned on either side of the knife gate on a top and/or a bottom surface of the transverse seal portion.

11. A knife gate valve comprising:
    an actuator configured to actuate the knife gate valve through a rotation or linear action;
    a stem configured to receive the rotation or linear action and, in response to the rotation or linear action, cause a knife gate to move linearly;
    a single-piece body configured to define a flow channel and to receive the knife gate slideably in response to the linear movement of the knife gate, wherein a sliding movement of the knife gate opens and closes the flow channel; and
    a two-piece seal comprising:
       a perimeter seal configured to fit into a perimeter groove along an inside surface of the body;
       a transverse seal configured to fit into a top portion of the body transversal to the flow channel, wherein the transverse seal includes a slot for the knife gate to slide through, a bottom groove to interlock with the perimeter seal, and two external grooves along two side surfaces of the transverse seal portion; and
       packing material configured to be injected into the two external grooves through at least two injection ports in a top portion of the single-piece body in order to energize the transverse seal.

12. The knife gate valve of claim 11, further comprising:
    a reinforcement wire embedded longitudinally into the perimeter seal.

13. The knife gate valve of claim 11, wherein the stem is threaded and the valve further comprises:
    a stem nut coupled to the knife gate and configured to move along the stem in response to the rotation of the stem cause the linear movement of the knife gate.

14. The knife gate valve of claim 11, further comprising:
    at least one set of scrapers configured to be positioned on either side of the knife gate on a top and/or a bottom surface of the transverse seal.

* * * * *